March 2, 1926.
H. G. HENNE
1,574,885
METHOD OF PROTECTING COTTON BALES
Filed July 31, 1924
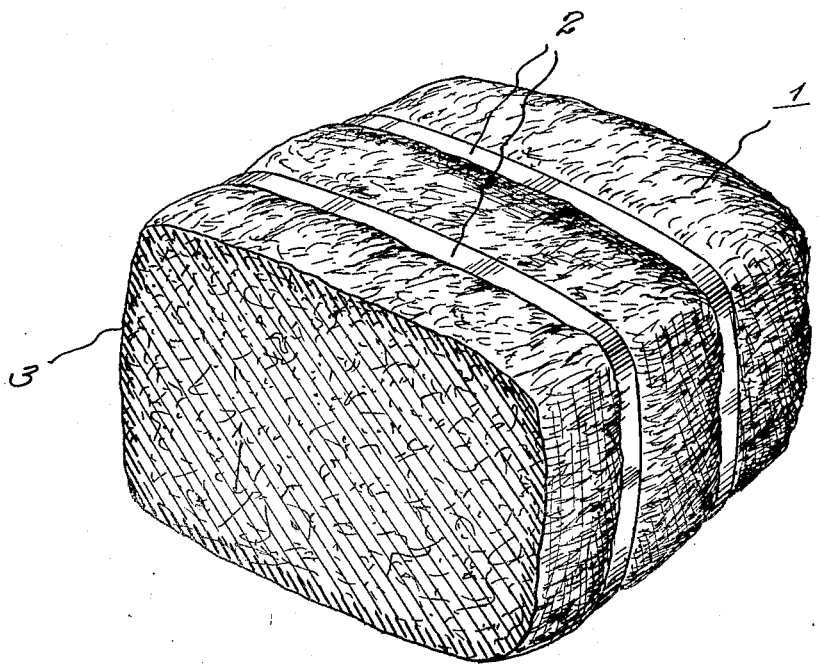
Herbert George Henne,
Inventor
By Clarence A. O'Brien
Attorney Patented Mar. 2, 1926.

1,574,885

UNITED STATES PATENT OFFICE.

HERBERT G. HENNE, OF NEW BRAUNFELS, TEXAS.

METHOD OF PROTECTING COTTON BALES.

Application filed July 31, 1924. Serial No. 729,427.

*To all whom it may concern:*

Be it known that I, HERBERT G. HENNE, a citizen of the United States, residing at New Braunfels, in the county of Comal and State of Texas, have invented certain new and useful Improvements in Methods of Protecting Cotton Bales, of which the following is a specification.

This invention relates to a method of protecting cotton bales.

It is customary after running the cotton through a gin to bale the same ready for shipment to suitable points to be manufactured into desired material. As the cotton leaves the gin, it is usually the custom to immediately bale the same in a partial covering of bagging, which serves to retain the form of the bale as well as to prevent the loss of loose cotton. After the same is baled, it is usually rolled from the gin into the cotton yard where it remains in the open, until it is stored in the warehouse or transported to a market. During this treatment of the bale it can be readily appreciated that the same is subjected not only to the action of the elements, while it is stored in the yard, but is exposed to dirt during the rolling from the gin into the yard, and also during its handling throughout the entire course of its travel from the gin to the manufacturing plant, where it is converted into suitable form for use. It will therefore be seen that large portions of the bales of cotton are rendered useless through the action of water, dirt and other of the elements, and oftentimes entire bales are rendered entirely useless for any purpose whatever. It will thus be seen that large losses are sustained in the cotton industry in the transportation of the bales and the handling thereof between the gin and the manufacturing plant and before the same are converted into suitable form for use.

It is the object of this invention to treat the cotton in baled form, whether it is provided with a bagging covering or not, in such a way as to render it waterproof or provide it with a protective covering, in order to eliminate the damage caused by the dirt or other elements and eliminate water where it is provided with a waterproof covering, in order to reduce the likelihood of shrinkage, reduce the inflammability, and thereby provide a protective covering for the entire cotton bale which will effectively prevent deterioration of the bale from the time it leaves the gin or baling press until it reaches the manufacturer for conversion into suitable form for use. The method contemplates the impregnating or coating of the surface portion of the bale of cotton with a suitable composition adapted to penetrate the surface portion thereof, or to adhere to the surface portion of the bale and to the cotton or to the cotton and bagging, and thereby form a protective skin or covering entirely around the bale.

The invention embodies other objects and advantages in providing a protection for cotton bales, which are more particularly pointed out in the following description and claims, directed to a preferred method or methods of carrying out the invention, it being understood, however, that various other means and methods may be used for accomplishing the results of the invention, which are clearly within the spirit and scope of the invention as described and claimed.

In the drawing, forming a part of this application the figure illustrates a portion of a cotton bale, showing the protective skin on the surface of the bale, formed as a result of the treatment prescribed by this present method.

As is well known in the art, the cotton is usually baled in compressed form and retained by a plurality of steel bands in bales of predetermined size well known in the art, and are usually provided with a covering or bagging or similar material to protect the bales. In the present case, however, it is immaterial whether the bagging is provided on the bale or not, as the necessity therefor is eliminated.

The bales of cotton in the usual form are first subjected to a coating or impregnating treatment with a suitable solution which may be applied by either suspending the bale from a suitable carrier in a vat containing the solution, spraying the solution onto the bale within a suitable chamber, or applying it with a brush or the like by hand, so that a portion of the outer surface of the cotton of the entire bale is impregnated with some of this solution. In the drawing, 1 indicates the cotton bale which is bound in compressed form for shipment by the usual band 2, to form a bale. The impregnated skin portion of the bale, which is impregnated and absorbs the solution with which it is treated is indicated at 3, in the sectional portion thereof, by the heavy section line.

It has been found by practical experiment that the treatment of a cotton bale with a suitable solution will effect the impregnation of the outer surface portion of the bale so that the cotton forming the outer portions of the bale will absorb a portion of said solution, which absorption or impregnation is of shallow depth, as indicated in the drawing, and which causes the fiber and loose portions of the cotton in the bale to be laid down firmly against the surface of the bale so that the solution will cause an adherence of the fiber and provide an impervious coating over the remaining portion of the bale, which is water-proof, moisture-proof, dirt proof, and is substantially flexible so that it will not crack or break.

A suitable form of solution which has been found by experimentation to have the properties adapted for use in connection with the present invention are the commercial forms of flexible varnishes manufactured for use in coating automobile tops and balloons.

Following the treatment with solutions for coating the bale as indicated, the same is conveyed to a suitable drain board for allowing the excess solution to be drained off, after which it is conducted to a suitable drying chamber heated to a sufficient temperature to accelerate the drying of the solution on the bale, it being understood, however, that if desired, the bale may be left in the atmosphere to dry, but which has been found to be disadvantageous in carrying out the method, as the drying of the bale can be accomplished more rapidly in a suitable drying chamber.

A suitable form of solution is used, which will provide an impervious covering for the cotton of the bale impregnated therewith, which, in dry form is substantially hard, but yet flexible, in order that the same will not crack during the handling of the bale in shipment and the like. While the coating slightly discolors the cotton on the surface of the bale, the penetration is only slight, so that only a small portion of the cotton bale is rendered useless as first grade material. However, it has been found that the treated portion of the cotton may be further treated to remove the composition therefrom, in which form the cotton which normally forms the exterior of the bale is highly useful as a second grade of material.

The coating or skin provided on the cotton bale prevents the deterioration of the remaining cotton in the bale, and excludes water and other forms of moisture from said bale, while at the same time reducing the likelihood of shrinkage, during shipment in baled form, and materially reduces the inflammability of the cotton. It should, therefore, be readily appreciated that a method has been provided for treating cotton bales with a suitable form of waterproofing solution, which will effect the impregnation of the surface portion of the bale, providing an impervious flexible protecting skin on the bale, having the advantages above pointed out.

It is to be understood that although the solution used in forming the protecting coating on this bale has been illustrated in the drawing as impregnating the surface portion of the bale, it is to be understood that such material may be used as will only form a protective coating adhering to the surface of the bale or such a material as will form a protective covering either adhering to the surface of the bale or impregnating the surface portion which may be of a substantially impervious character, but which is not necessarily waterproof, as it has been found that under such conditions, a coating which is not waterproof can be provided on the surface of the bale at a considerably smaller expense due to the ingredients used being of smaller cost than applying the waterproof covering. It has also been found that a non-waterproof covering serves to protect the contents of the bale in the same manner as a waterproof covering, and that it is considerably easier to protect the bale against moisture or water than from the destructive action of dirt and other elements.

What is claimed is:

1. A method of treating cotton bales consisting in applying to said bale a solution adapted to partially impregnate the bale around the surface portion, draining the excess solution from the bale and subjecting the bale to a drying treatment, for drying the remaining solution thereon to form a protective covering over the interior portion of said bale.

2. A method of treating cotton bales to provide a protective surface on the bale consisting in applying to said bale a solution adapted to form with the outer surface portion of the bale a protective covering for the interior thereof.

3. A method of treating cotton bales consisting in applying to said bale a solution adapted to form with the outer surface portion of the bale, a flexible moisture proof protective covering for the interior thereof.

4. A method of treating cotton bales to provide a protective covering on the bale consisting in applying to said bale a solution adapted to form on the outer surface portion thereof an impervious moisture proof covering.

5. A method of treating cotton bales consisting in subjecting the surface portion of the bale with a solution adapted to form therewith a protective covering for the contents of the bale.

6. A method of treating cotton bales consisting in applying a composition to the surface of the bale to form therewith a protective covering over the contents of the bale.

7. A method of treating cotton bales consisting in applying a solution to the surface portion of the bales, drying said solution thereon to form a protective covering on the bale during transportation, subsequently separating the covering portion from the remainder of the bale for use and separating the cotton content of the covering portion from the remaining portion.

In testimony whereof I affix my signature.

HERBERT G. HENNE.